United States Patent [19]

Stevenson

[11] 4,429,592

[45] Feb. 7, 1984

[54] VALVE OPERATOR

[75] Inventor: Thomas E. Stevenson, Willoughby Hills, Ohio

[73] Assignee: The Babcock & Wilcox Company, New Orleans, La.

[21] Appl. No.: 270,948

[22] Filed: Jun. 5, 1981

[51] Int. Cl.³ .............................................. F16K 31/14
[52] U.S. Cl. ........................................ 74/625; 251/14; 74/424.8 VA
[58] Field of Search .................... 251/14, 130; 74/625, 74/424.8 VA

[56] References Cited

U.S. PATENT DOCUMENTS

| | | | |
|---|---|---|---|
| 2,698,157 | 12/1954 | Ludeman | 251/14 |
| 2,850,364 | 9/1958 | Dowling | 251/14 X |
| 3,198,033 | 8/1965 | Fry | 74/625 |
| 3,842,854 | 10/1974 | Wicke | 251/14 X |

*Primary Examiner*—Ernest R. Purser
*Attorney, Agent, or Firm*—Vytas R. Matas; Robert J. Edwards

[57] ABSTRACT

A valve operator (10) which includes a ball screw (28) in constant engagement with the output shaft (24) of an air cylinder for automatic operation of the valve, and which includes a manual drive means (20) engageable with the ball screw (28) in any position thereof. The manual drive means (20) includes a ball nut (30) engaged with the ball screw (28), a clutch output member (34) attached to the ball nut (30), a clutch input member (38) which is rotatable by a handwheel (56) through a worm gear train (49, 52), and a manually actuatable clutch actuating assembly (42) which is operable to engage the clutch input member (38) with the clutch output member (34).

8 Claims, 2 Drawing Figures

VALVE OPERATOR

TECHNICAL FIELD

The present invention relates generally to valve operators, and more particularly to a valve operator of the type which is normally automatically actuated, but which can also be manually actuated.

BACKGROUND ART

Manual actuators for automatic control valves of the type in which the valve element is moved linearly generally incorporate a power screw rotated by a handwheel. In applications where relatively high force is required to actuate the valve element, a worm gear set between the handwheel and the power screw is often required to multiply the torque applied to the valve element.

The power screw is usually mounted above the automatic actuator and in line with the valve stem and actuator shaft, the power screw pushing or pulling on the actuator shaft which operates the valve stem.

In a valve operator of this type, it is advantageous if the manual actuator is self-locking so that unbalanced loads on the valve element cannot change the valve position when the operator is in its manual mode of operation. Since the valve element must be free to move when in the automatic mode of operation, it is necessary to stroke the manual actuator of a self-locking unit into a retracted position when valve operation is transferred from the manual to the automatic mode of operation. Also, when it is desired to transfer from the automatic mode to the manual mode, it is necessary to stroke the manual actuator until its position coincides with that of the valve before manual actuation of the valve can begin. This requirement of stroking the manual actuator when transferring from one mode to the other mode of operation is time and energy consuming and can put a practical limitation on the length of stroke of the valve element which this type of operator can accommodate and causes delays relative to emergency operation.

Because of the foregoing, it has become desirable to develop a valve operator which can be easily transferred from the manual to the automatic mode of operation and vice versa without stroking the manual actuator, and which is of simple construction.

SUMMARY OF THE INVENTION

The present invention solves the aforementioned problems associated with the prior art as well as other problems by providing a ball screw which is in constant engagement with the valve element to apply linear motion to the valve element upon actuation of the automatic operator, and a ball nut which drives the ball screw in the manual mode of operation. A worm gear, which is rotated by a handwheel, engages a worm wheel which selectively engages the ball nut by means of a clutch mechanism. In the automatic mode of operation, the clutch is left in its disengaged position, and the ball nut merely rotates freely with the ball screw. To change to the manual mode of operation, the clutch is engaged in any position of the valve mechanism, connecting the ball nut to the handwheel by means of the worm gear and worm wheel, whereupon the ball screw is rotated by the ball nut to operate the valve mechanism.

DESCRIPTION OF THE PREFERRED EMBODIMENT

Figure 1:
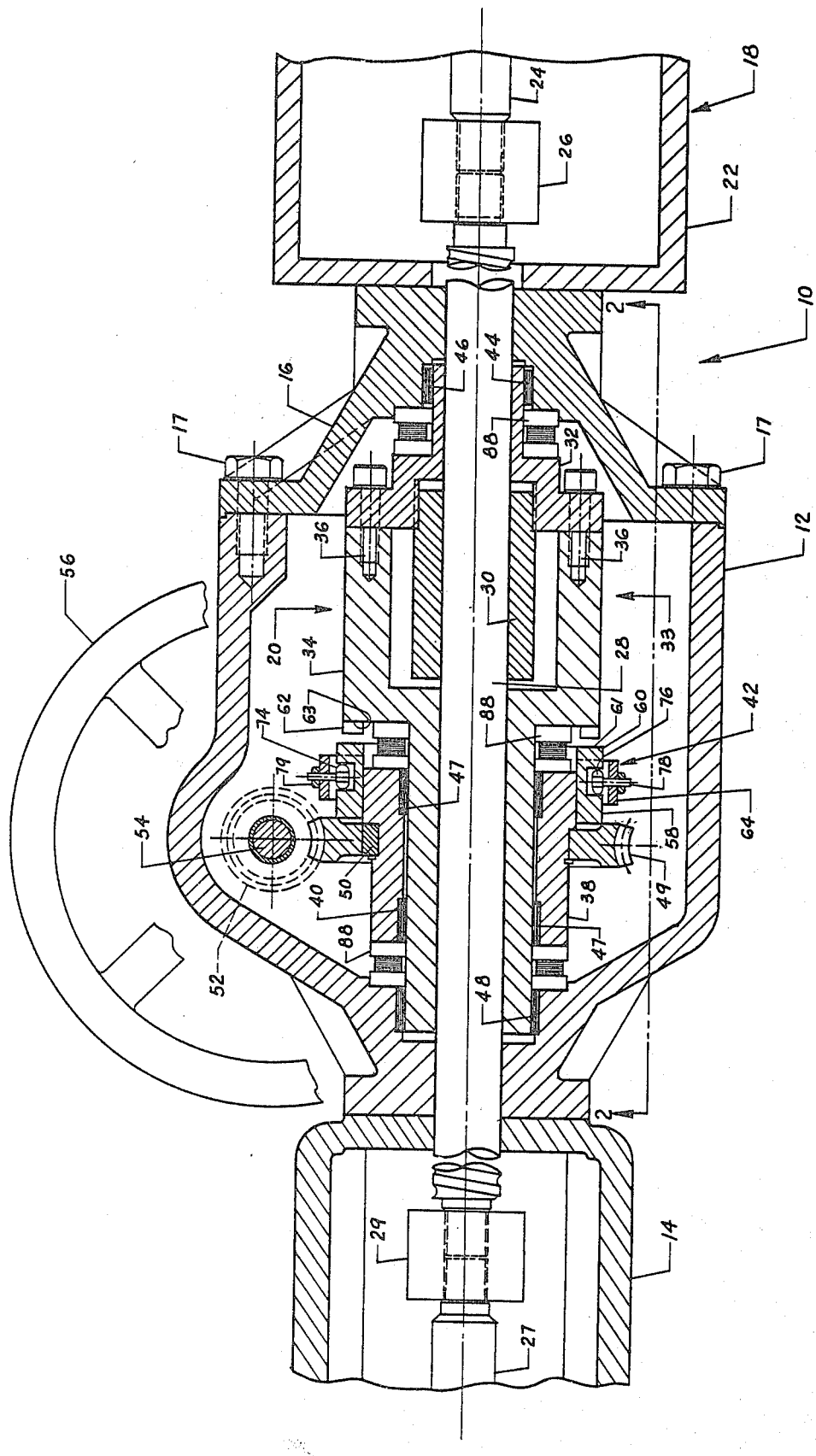
FIG. 1 is a cross-sectional view of the valve operator constructed in accordance with the present invention.

Referring now to the drawings where the illustrations are for the purpose of describing the preferred embodiment of the present invention and are not intended to limit the invention hereto, FIG. 1 illustrates a valve operator 10 comprising an annular frame 12 which is bolted or otherwise attached to a portion of a valve body 14, a cover member 16 bolted to the frame 12 by means of bolts 17, an automatic valve stem drive assembly 18 bolted or otherwise attached to the cover member 16, and a manual valve stem drive assembly 20 rotatably mounted within the frame 12.

The automatic valve stem drive assembly 18 is of known construction and will not be described herein in detail. The assembly 18 comprises an air cylinder with piston rod 24, a first coupling 26 which is engaged with the piston rod 24, and an elongated drive shaft in the form of a ball screw 28 which is coupled at one end to the piston rod 24 by means of the coupling 26. The opposite end of the ball screw 28 is coupled to a valve stem 27 by means of a second coupling 29.

The manual valve stem drive assembly 20 is comprised of a ball nut 30 engageable with the ball screw 28 in a conventional manner, a ball nut adapter 32 pressed into or otherwise attached to the ball nut 30, a clutch assembly 33 comprising an output member 34 fastened to the ball nut adapter 32 by means of screws 36, and an input member 38 rotatable on an elongated portion 40 of the output member 34 and normally disengaged from the output member, and a clutch actuating mechanism 42 which is operable to put the input member 38 into engagement with the output member 34.

The ball nut adapter 32 includes an elongated shank portion 44 having an inside diameter rotatable on the ball screw 28, and an outside diameter rotatable relative to the cover member 16 within a bearing 46 mounted therein. The elongated portion 40 of the clutch output member 34 also has an inside diameter rotatable on the ball screw 28 and an outside diameter rotatable relative to the frame 12 within a bearing 48 mounted therein. The clutch input member 38 surrounds the elongated portion 40 of the clutch output member 34 and rotates thereon on bearings 47. A worm wheel 49 is attached to the clutch input member 38 by means of a key 50, and a worm gear 52, which is pressed or otherwise attached to a shaft 54 journaled in the annular frame 12, is in meshing engagement with the worm wheel 49. A handwheel 56 is pressed on the end of the shaft 54 opposite the worm gear 52 for manual operation of the valve operator 10.

Figure 2:
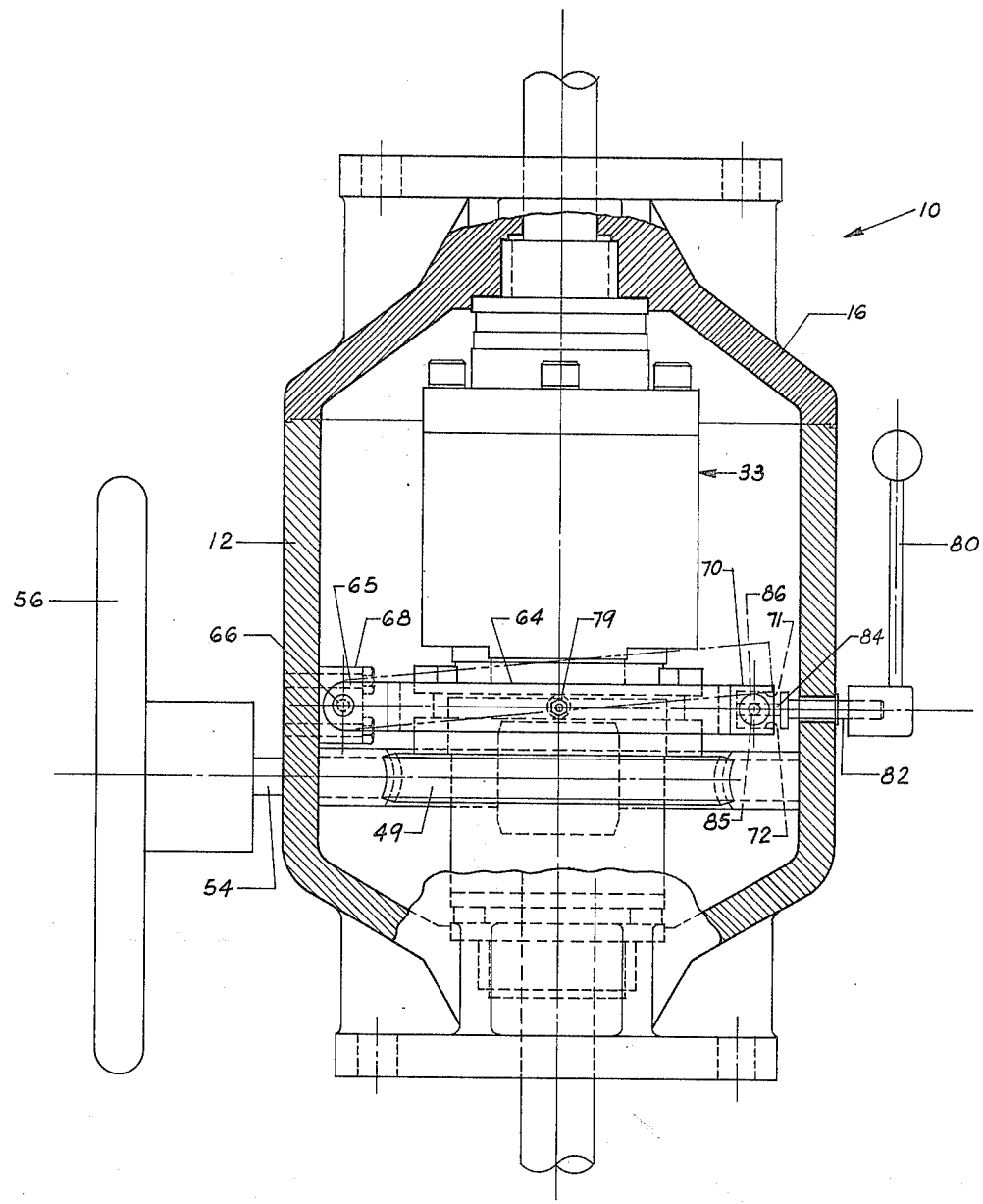
FIG. 2 is a cross-sectional view taken along section-indicating lines 2—2 of FIG. 1.

The clutch actuating assembly 42 comprises a clutch engaging ring 58 which is splined to the input member 38 and has a plurality of teeth 60 formed on the upper face 61 thereof which are engageable with teeth 62 formed on the lower face 63 of the clutch output member 34. An actuating ring 64 surrounds the engaging ring 58 and includes outwardly extending ears 65 which, as shown in FIG. 2, are attached at 66 to a block 68 which is bolted or otherwise attached to the inside wall of the frame 12. The opposite end of the actuating ring 64 is formed into a yoke 70 having an upper wall 71 and a lower wall 72. The engaging ring 58 has an annular groove 74 formed therein which receives opposed rollers 76 rotatably mounted on pins 78 threadably received on the actuating ring 64 and locked thereto by means of nuts 79.

The actuating ring 64 and the engaging ring 58 are normally in the position shown in the solid lines in FIG. 2. To engage the clutch input member 38 with the output member 34, the actuating ring 64 is pivoted from the solid line position to the dotted line position, thereby sliding the engaging ring 58 along its splined connection with the input member 38 to engage the teeth 60 formed thereon with the teeth 62 provided on the output member 34.

An actuating lever 80 is provided to shift the actuating ring 64 from the disengaged (solid line) position to the engaged (dotted line) position. The lever 80 is pressed or otherwise fixed to a shaft 82 which is received through a hole formed in the frame 12, the axis of the shaft 82 being offset somewhat from the plane of the paper. The shaft 82 includes a smaller diameter and portion 84 which is formed into an L-shape with one leg 85 of the L extending outwardly from the paper as shown in FIG. 2, and having a ball 86 received thereon and retained by means of a cotter pin. The ball 86 is received between the upper and lower walls 71 and 72 of the yoke 70, and the actuating ring 64 is moved from its disengaged position to its engaged position by rotating the lever 80 clockwise as viewed from the right of FIG. 2 which causes the leg 85 of the shaft end portion 84 to pivot upwardly. It can be appreciated that the actuating means illustrated is just one of the several known means available to shift the clutch members into and out of engagement.

To take up thrust loads when the manual actuator is engaged, thrust bearings 88 are provided between the ball nut adapter 32 and the cover member 16, between the clutch input member 38 and the clutch output member 34, and between the clutch input member 38 and the frame 12.

OPERATION

In the automatic mode of operation, the valve stem 27 is stroked by pressurizing the air cylinder (not shown) to stroke the output shaft 24 and thus stroke the ball screw 28. With the clutch assembly in the disengaged (solid line) position of FIG. 2, forces between the ball nut 30 and the ball screw 28 will cause the ball nut 30 and the clutch output member 34 attached thereto to rotate freely within the clutch input member 38.

When the valve actuator is to be actuated manually, the lever 80 is rotated clockwise as viewed from the right of FIG. 2 to move the yoke 70 of actuating ring 64 upwardly causing the actuating ring 64 to move upwardly to the engaged (dotted line) position of FIG. 2. While this is occurring, the rollers 76 act on annular groove 74 in the engaging ring 58 sliding the engaging ring 58 upwardly on the clutch input member 38 to engage the teeth 60 formed on the engaging ring 58 with the teeth 62 on the clutch output member 34. With the clutch members engaged, the handwheel 56 is rotated to rotate the worm wheel 49. Rotation of the worm wheel 49 rotates the clutch input member 38, and the output member 34 through the engaging ring 58, thus rotating the ball nut 30 attached to the clutch output member 34. Rotation of the ball nut 30 causes stroking of the ball screw which, in turn, strokes the valve stem 27.

When the valve actuator is to be shifted back to its automatic mode of operation, the lever 80 is moved back to the position illustrated in FIG. 2, which moves the actuating ring 64 back to its disengaged (solid line) position and disengages the engaging ring 58 from the clutch output member 34.

Certain modifications and improvements will occur to those skilled in the art upon reading the foregoing. It should be understood that all such modifications and improvements have been deleted herein for the sake of conciseness and readability but are properly within the scope of the following claims.

I claim:

1. A valve operator comprising a frame, a valve actuating shaft mounted for stroking within said frame, including at least a portion which defines a ball screw, first drive means in constant engagement with and operable to stroke said shaft, second drive means operable to stroke said shaft and being selectively engageable with said shaft in any operative position thereof including a ball nut in constant engagement with said shaft having a clutch output member attached to said ball nut, means for selectively driving said ball nut to stroke said shaft, a clutch input member normally disengaged from said clutch output member, engaging means operable to engage said input member with said output member, first manually operable means attached to said input member and operable to rotate said input member, and means connected to said engaging means to move said engaging means between a first position wherein said input and output members are disengaged and a second position wherein said input and output members are engaged.

2. The apparatus as defined in claim 1 wherein said first manually operable means comprises a shaft rotatably mounted to said frame, a handwheel mounted on one end of said shaft, a worm gear mounted on said shaft, and a worm wheel attached to said clutch input member and in meshing engagement with said worm gear.

3. The apparatus as defined in claim 1 wherein said clutch output member comprises a first cylindrical member surrounding said valve actuating shaft for rotation relative thereto, said clutch input member comprises a second cylindrical member surrounding said valve actuating shaft for rotation relative thereto, said engaging means comprises a third cylindrical member mounted on said clutch input member for rotation therewith and for linear movement therealong, and said first cylindrical member and said third cylindrical member have interengageable teeth formed thereon, said teeth being out of engagement when said third cylindrical member is in a first linear position relative to said second cylindrical member, and in engagement when said third cylindrical member is in a second linear position relative to said second cylindrical member.

4. The apparatus as defined in claim 3 including an adapter member surrounding said valve actuating shaft for rotation relative thereto and including an elongated portion journaled in said frame, means attaching said adapter member to said ball nut, and means attaching said adapter member to said first cylindrical member.

5. The apparatus as defined in claim 4 wherein said first cylindrical member includes a first diameter portion surrounding said ball nut, and a second reduced diameter portion journaled in said frame, said second cylindrical member being journaled on said second portion of said first cylindrical member.

6. The apparatus as defined in claims 3, 4, or 5 wherein said means connected to said engaging means comprises second manually operable means operable to move said third cylindrical member between said first linear position and said second linear position.

7. The apparatus as defined in claim 6 wherein said second manually operable means comprises means pivotally mounted on said frame and in engagement with said third cylindrical member, and hand lever means engageable with said pivotally mounted means.

8. The apparatus as defined in claim 7 wherein said hand lever means comprises a shaft rotatably received in said frame, a hand lever attached to one end of said shaft, and offset lever means on the opposite end of said shaft engageable with said pivotally mounted means to pivot said pivotally mounted means between a first position wherein said third cylindrical member in engagement therewith is in its first linear position and a second position wherein said third cylindrical member is in its second linear position.

* * * * *